H. L. ANDREWS.
Improvement in School Desks.
No. 4,723. Reissued Jan. 30, 1872.
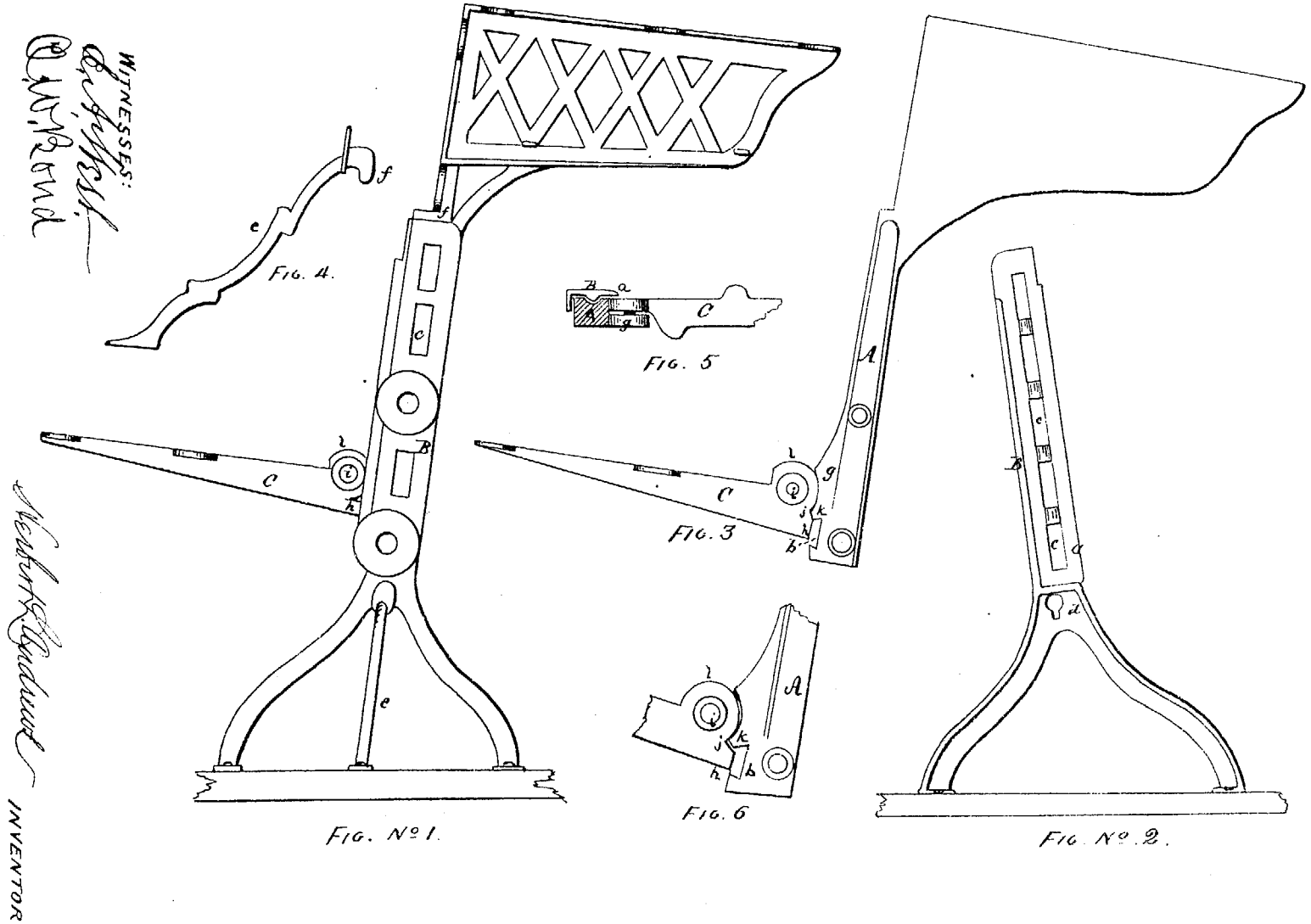
WITNESSES:
C. A. West.
C. W. Bond
Herbert L. Andrews INVENTOR
AM. PHOTO-LITHOGRAPHIC CO. N.Y. (OSBORNE'S PROCESS.)

UNITED STATES PATENT OFFICE.

HERBERT L. ANDREWS, OF CHICAGO, ILLINOIS.

IMPROVEMENT IN SCHOOL-DESKS.

Specification forming part of Letters Patent No. 82,061, dated September 15, 1868; reissue No. 4,723, dated January 30, 1872.

SPECIFICATION.

*To all whom it may concern:*

Be it known that I, HERBERT L. ANDREWS, of Chicago, in the State of Illinois, have invented certain new and useful Improvements in School-Desks and Seats; and I do declare that the following is a full, clear, and exact description of the same, reference being had to the accompanying drawing making a part of this specification, in which—

Figure 1 is an inside view of a single standard; Fig. 2, an inside view of the lower part; Fig. 3, the upper part; Fig. 4, a detached view of the brace; Fig. 5, a top view of the joint and cross-section of the standard; and Fig. 6, a detail, showing the tops of the joint.

The object of my invention is to construct the different parts of the standard for a school-desk, so as to make the seat or top adjustable in height; to hold the two parts more securely together and in place; to construct a simple and convenient joint for the arms of the seats; to construct such joint so that it shall be noiseless; so that the seat shall not strike against the back of the desk; in providing a stop to prevent the seat from tipping too far down when the rubber or spring is misplaced; and to so make the several parts that when they are put together the seat-arm shall be secured in its place without the use of a bolt or nut.

To enable others skilled in the art to make and use my invention, I will proceed to describe it construction and operation.

I construct my standard in two parts. The upper part A is so made that the top of the desk and a shelf may be attached in the usual manner. So much of this upper portion as comes in contact with the lower is made concave, and the corresponding part of the lower portion of the standard is made convex. The two parts are secured together by means of nuts and screws which pass through the openings *c*. These parts being respectively concave and convex will be much more firmly held in place than if their surfaces were plane or smooth. On the front edge of the lower part B is a flange, *a*. This flange holds the seat-arm C in its place, and also secures the rubber or other spring in the recess *b*, as hereinafter described. The other part of the standard A has a projection, *g*, at the lower end and in front, which forms a head, upon which is placed the axle *i* to receive the seat-arm C. This projection *g* is recessed or cut away on the inside so as to form a bearing for the seat arm around the axle *i*, and also so as to form a stop for the curved portion of the end of the seat-arm to strike against when the seat is raised, as shown at Figs. 3 and 6. This portion *l* of the seat-arm is made cam-like or slightly eccentric, so that it does not touch the back portion of the recess except when the seat is turned up, in which event the contact is gradual and without noise, and when so turned up the seat is not easily jostled down. This feature of my invention and the stops can be used on all styles of standards, whether in two parts or not. In the lower end of the part A and in front is a recess, *b*, in line with the end or projection *h* of the arm C, and of the form shown. This recess forms, in connection with curved back of the recess around the axle *i*, a stop, *k*, which enters into the opening *j* of the seat-arm, and prevents the seat from turning too low down in case the rubber or spring works out, and also prevents any injurious compression of the rubber or spring. When the two parts of the standards are together the flange *a* covers the side of the recess *b*, and a chamber is formed, open only in front, into which said recess I insert a piece of rubber or other elastic substance, against which the projection or end *h* of the arm strikes when the seat is down and thus prevents noise.

In putting the several parts together the arm C is placed upon the axle *i* and the rubber or spring placed in the recess *b*. The two parts are then secured together. The flange *a* extending over the curved end of the arm C and over the recess *b* makes it impossible for the arm to get out of place, though no bolt or other fastening is used. The curved end of the arm is so arranged that in moving the seat up and down it will not rub against the projection *g* or flange *a*. *e* is a brace, provided at its upper end with a hook, *f*, which is inserted in the opening *d* of the standard, and the lower end secured to the floor by means of a screw. I use a brace to each standard and place the same on the inside. I find these braces very efficient in preventing the lateral motion of the desk and in strengthening the same. A recess for the reception of the rubber might be provided in the end or projection *h* of the arm C, the main object of the rubber being to prevent noise.

Having thus fully described my invention, what I claim as new, and desire to secure by Letters Patent, is as follows:

1. The standard, composed of two parts, A B, one provided with the projection *g* and axle *i*, and the other with the flange *a*, in combination with the arm C, the standards being secured by the screws and nuts, all substantially as specified.

2. The combination and arrangement of the recess *b*, when filled with rubber or other elastic material, standard B, and projecting heel *h* of the arm C, substantially as and for the purposes specified.

3. The stop *k*, in combination with the arm C and the elastic stop *b h* for preventing any injurious compression of the spring and the passage of the seat below the proper plane, substantially as described.

4. The eccentric stop *l*, in combination with the projection *g*, arm C, and standard A, substantially as and for the purposes specified.

HERBERT L. ANDREWS.

Witnesses:

E. A. WEST,

O. W. BOND.